United States Patent [19]

Weiler et al.

[11] Patent Number: 4,807,725
[45] Date of Patent: Feb. 28, 1989

[54] FLOATING CALIPER SPOT-TYPE DISC BRAKE

[75] Inventors: Rolf Weiler, Frankfurt am Main; Uwe Bach, Niedernhausen; Thomas H. Kirst, Hilders; Klaus Paschke, Frankfurt am Main, all of Fed. Rep. of Germany

[73] Assignee: Alfred Teves GmbH, Frankfurt am Main, Fed. Rep. of Germany

[21] Appl. No.: 162,927

[22] Filed: Mar. 2, 1988

[30] Foreign Application Priority Data

Mar. 6, 1987 [DE] Fed. Rep. of Germany ....... 3707156

[51] Int. Cl.$^4$ .............................................. F16D 65/54
[52] U.S. Cl. ................................. 188/71.8; 188/73.44;
188/196 P

[58] Field of Search .................. 188/71.8, 73.44, 73.45,
188/79.63, 79.64, 196 P

[56] References Cited

U.S. PATENT DOCUMENTS 4,318,458 3/1982 Ritsema ............................ 188/73.44
4,436,186 3/1984 Ritsema et al. ..................... 188/71.8

FOREIGN PATENT DOCUMENTS 2142698 1/1985 Fed. Rep. of Germany ... 188/73.44

Primary Examiner—Duane A. Reger
Attorney, Agent, or Firm—James B. Raden

[57] ABSTRACT

The present invention is concerned with a disc brake and in particular to a floating caliper spot-type disc brake. In the practice of the invention, a holding member in the area of a bore in the brake housing has a smaller diameter than the bore diameter.

11 Claims, 7 Drawing Sheets

C-C

B-B

4,807,725

FLOATING CALIPER SPOT-TYPE DISC BRAKE

BACKGROUND OF THE INVENTION

The present invention relates to a floating caliper spot-type disc brake and brake carrier arrangement.

A caliper spot-type disc brake of this type is illustrated in FIGS. 4 through 6 of German Patent application DE-OS No. 35 10 372 which discloses an active-clearance device. The device disclosed comprises a holding member provided with a continuous recess forming an annular groove including a first slide wall, a groove bottom and a second side wall formed by an annular member. The annular member is connected by friction welding to the base body of the holding member, with a groove-and-tongue-type connection being provided between the two parts. Disposed in the annular groove is a friction ring which, with friction fit, is seated on the guide bolt of the arrangement and which is supported on the side wall formed by the element. Located between the friction ring and the side wall is a cup spring supported on the two parts. A free space for preserving the efficiency of the sleeve-type, elastic element, in this device is provided between the inner delimitation of the recess and the bolt. The cup spring is of a corresponding configuration.

In this device, hook-type lugs form abutment faces, whereas the holding member forms abutment faces that are engaged, with axial clearance s, by a section of the brake housing.

SUMMARY OF THE INVENTION

It is the object of the present invention to provide for a simplified guide bolt arrangement having an active clearance.

According to the invention the guide bolt arrangement for mounting the caliper to the carrier includes an elastomeric member in a bore in the caliper surrounding the guide bolt and a holding member in the elastomeric member and having a diameter less than the diameter of the bore forming a clearance space. A friction member is mounted to the holding member and to the guide bolt for axial movement with the holding member.

BRIEF DESCRIPTION OF THE DRAWING

The invention will now be explained in greater detail with reference to the accompanying drawing, wherein.

DETAILED DESCRIPTION OF A PREFERRED EMBODIMENT

Figure 1:
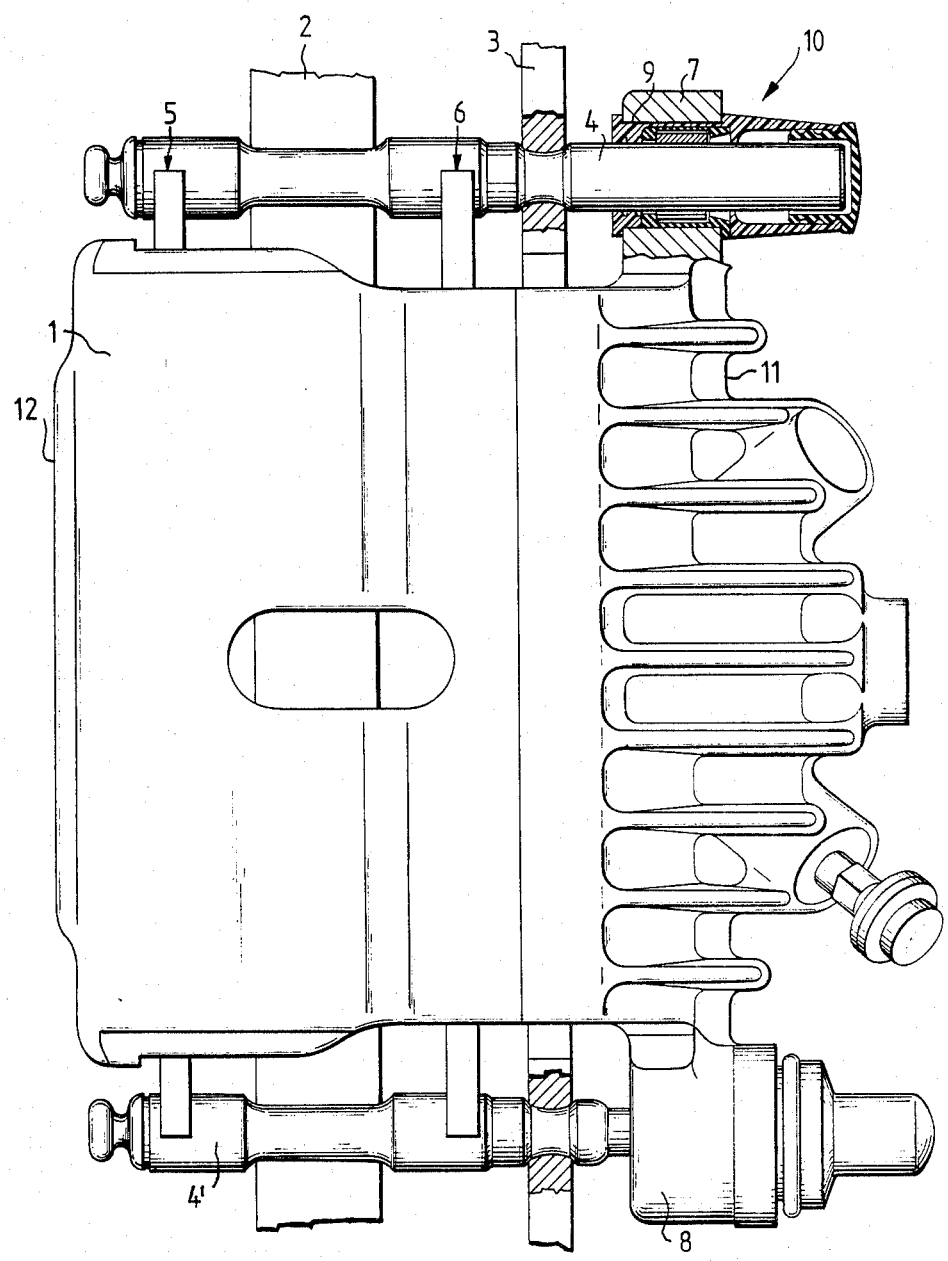
FIG. 1 is a top view of a spot-type disc brake and mounting arrangement with a portion cutaway showing details of the bolt guide.

The floating caliper spot-type disc brake as shown in FIG. 1 comprises a floating caliper 1, hereinafter referred to as brake housing. The U-shaped brake housing 1 straddles the outer rim of a brake disc 2, with the brake housing 1 being disposed in axially displaceable manner on a brake carrier 3 rigidly secured to the automotive vehicle. Guide bolts 4, 4' are provided that are circumferentially disposed in spaced relationship, in axially parallel alignment with the brake carrier 3, for axial guidance of the brake housing 1, on brake carrier 3. The guide bolts protrude beyond the outer rim of the brake disc 2. Disposed on either side of the brake disc 2 are brake pads 5, 6 supported on the guide bolts 4, 4'. On the side of the brake carrier 3 facing away from the brake disc 2, extensions of the guide bolts 4, 4' are provided which serve for the bearing of the brake housing 1. On the opposite side, the brake housing 1 is supported over the corresponding brake pad 5. For guiding on the guide bolts 4, 4', the brake housing 1 includes lugs 7, 8 extending substantially in the circumferential direction and provided with axially parallel bores of which only bore 9 is shown in FIG. 1.

Provided between the guide bolt 4 and the lug 7, within the bore 9, is a bolt guide arrangement 10. The brake housing 1 includes two substantially radially extending legs 11, 12, with the inner leg 11 of the brake housing 1 including an actuating means (not shown) in the form of a piston-cylinder unit. The actuating means acts directly upon a first brake pad 6 disposed on one side of the brake disc 2, while it acts indirectly, through housing 1, upon a second brake pad 5 disposed on the other side of the brake disc 2. The inner brake pad 6, by the actuating means is actuated directly while the outer brake pad 5, through a corresponding displacement of the brake housing 1, in the opposite direction, is actuated indirectly in known manner.

Figure 2:
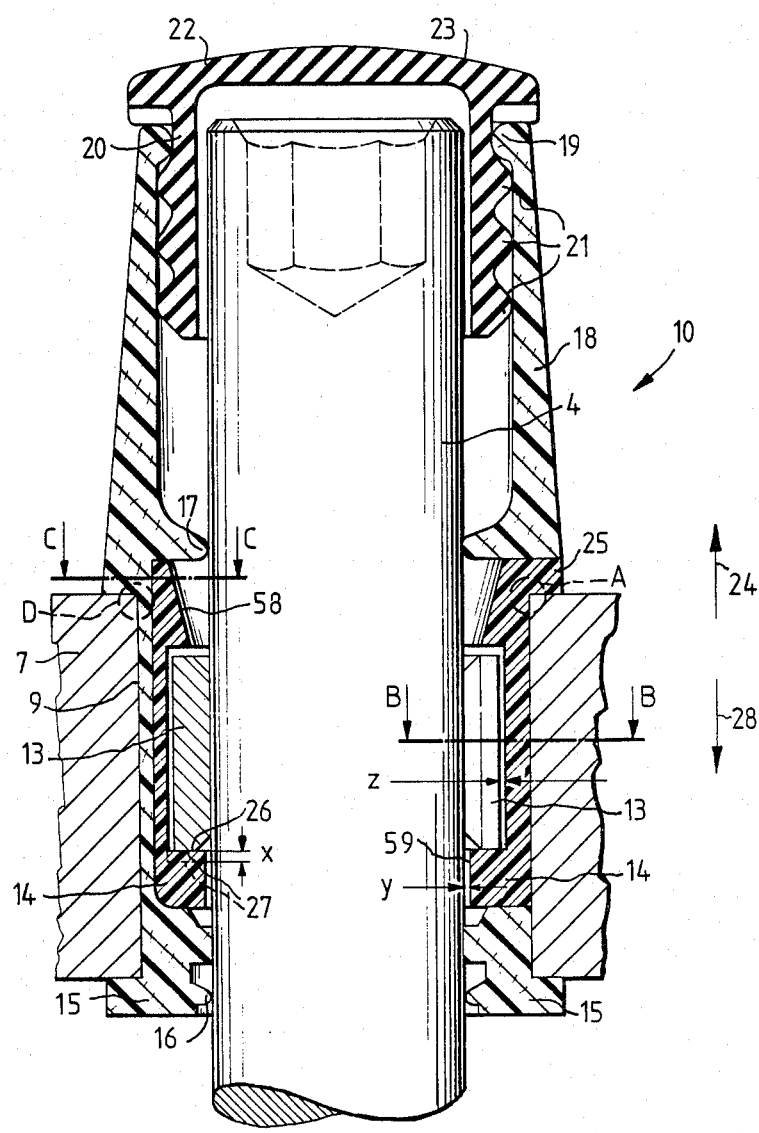
FIG. 2 is an enlarged longitudinal cross section through a portion of the bolt guide of FIG. 1 showing details of construction.

FIG. 2 shows the guide bolt 4 on which is mounted a friction ring 13. Disposed between the friction ring 13 and the lug 7 are a holding member 14, hereinafter referred to as the plastic part, and an elastomeric part 15. The elastomeric part 15 is provided with sealing lips 16, 17 radially surrounding the guide bolt 4 which prevents the ingress of dirt particles and other contaminations into the bore 9. The elastomeric part 15 can be made of rubber having a teflon insert, and/or of a slidable rubber material. The elastomeric part 15 comprises a sleeve-type section 18, hereinafter referred to as a sleeve, along with a lug 19. A part of the sleeve 18 encloses a shaft 20, including rings 21, of a closure cap 22 having a lid 23. The sleeve 18, the lug 19 of the sleeve 18 and the closure cap 22 are so deformable that the shaft 20 of the closure cap 22 is capable of being introduced into the sleeve, with the lug 19 of the sleeve 18 and the rings 21 of the cap 22 being so dimensioned that after introduction of the shaft 20 into sleeve 18, they will hook together as shown in FIG. 2.

The bolt guide arrangement 10 includes the bore 9 in lug 7, the friction ring 13, the plastic part 14 and the elastomeric part 15. A bearing, hereinafter referred to as a bushing, comprises the plastic part 14 and the elastomeric part 15. The bushing can be secured in the lug 7. When applying the brakes, the lug 7 is displaced in the direction 24 as shown in FIG. 2. Through a radial projection 25, hereinafter referred to as the bulge, on the plastic part 14, the plastic part 14 is forced against the friction ring 13. For that purpose, first the distance x is covered between the friction ring 13 and the plastic part 14 before the two faces 26 and 27 of the friction ring 13 and the plastic part 14 come into abutment. Adhesion of the friction ring 13 to the shaft 4 is so dimensioned that the plastic part 14 is first arrested and, when lug 7 is moved on in the direction 24, spring action is stored at point A in FIG. 2, between the lug 7 and the plastic part 14. Only after loading of the "spring" at point A, is the friction ring 13, through the plastic part 14, moved onward by the lug 7 in the direction 24. Movement of the friction ring 13 in the direction 24 is effected as the brake pad 6 is reduced in thickness through friction in the event of disc deflection or caliper deformation. The spring action at point A between the lug 7 and the plastic part 14 serves to adjust, after termination of the braking process, a clearance between the brake pad 5 and the brake disc 2. After release of the brake, the adhesion of the friction ring 13 on the shaft 4 is so dimensioned that the spring action at point A forces the lug 7 and, hence the entire brake caliper 1 in the direction 28 as shown in in FIG. 2.

This structure separates the brake pad 5 from the brake disc 2 to provide an active clearance between the brake pad 5 and the brake disc 2, respectively. The elastomeric part 15 is of a rubber-type consistency and serves as a seal through sealing lips 16, 17, and as a damping mechanism acting in a radial direction to damp radial movement of the bolt 4 in the bore 9. Between the guide bolt 4 and a stop face 59 on the plastic part 14 there is provided a radial clearance z and y, respectively, as shown in FIG. 2. The plastic part 14 provides a radial supporting effect when the radial clearance y and z is taken up respectively. Within the radial clearance, the elastomeric part 15 guides the lug 7, in a damping manner, on the bolt 4. The plastic part 14, in the area of the bore 9, is of a smaller diameter than the bore diameter. This simplifies manufacture of the bore 9 as compared with the state of the art devices. To mount the friction ring 13 on the guide bolt 4 within a receiving area, the plastic part 14 comprises a cone-shaped face 58 radially expanding outwardly which causes spreading of the plastic part during introduction of the ring 13.

Figure 3:
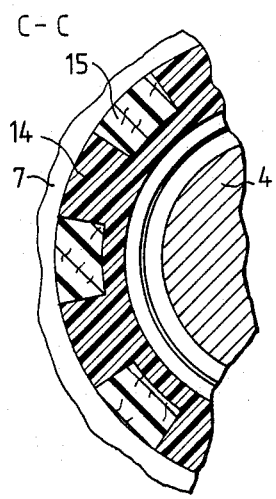
FIG. 3 is a partial transverse cross sectional view of the bolt guide showing details of construction.

FIG. 3 shows a partial cross-section C—C of the plastic part 14 arranged in the elastomeric part 15. The plastic part 14 includes longitudinal grooves in the axial direction of the guide bolt 4 which are engaged by the elastomeric part 15.

Figure 4:
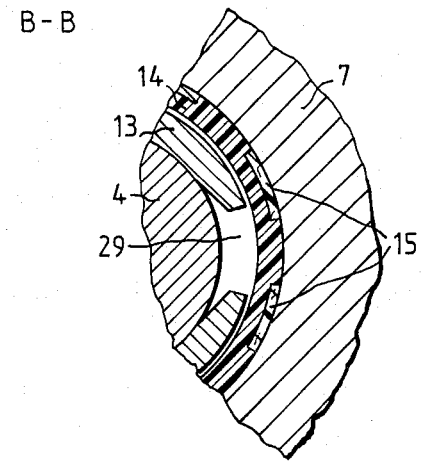
FIG. 4 is another partial transverse cross sectional view of the bolt guide showing further details of construction.

FIG. 4 shows a partial cross-section B—B of the friction ring 13 arranged between the plastic part 14 and the shaft 4. The friction ring 31 advantageously, is made of spring-hard bronze. The friction ring 13, advantageously, is a slitted sleeve which, in the axial direction of the shaft 4, comprises a slot 29 so that the guide bolt 4 is straddled in radially resilient manner.

Figure 5:
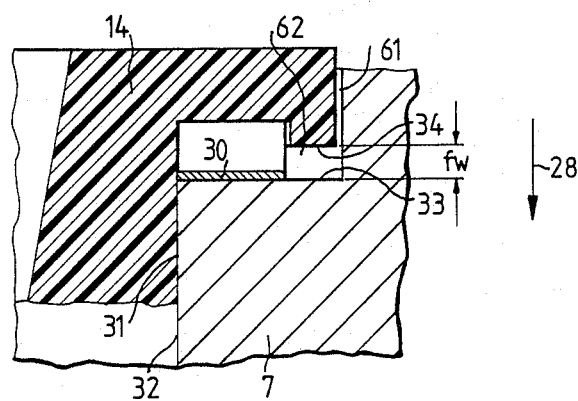
FIG. 5 is a partial transverse cross sectional view of a portion of a bolt guide providing an active clearance.

FIG. 5 shows an enlarged portion A in FIG. 2 arranged between the lug 7 and the plastic part 14. The abutment face 34 of the plastic part 14 is displaceable relative to the abutment face 33 of the lug 7. When applying the brake, faces 33 and 34 of the lug 7 and the plastic part 14 are forced one against the other and spring action is stored in a sleeve spring 30 hereinafter referred to as (slitted) wave spring 30. The elastomeric part 15 is of a rubber-type consistency and, at points A, D, see FIG. 2, is so deformable that the spring action of the elastomeric part 15 is small as compared to the spring action of the slitted wave spring 30. The distance fw, in FIG. 5, between the two faces 33 and 34 is the spring deflection. During brake release, the wave spring 30 forces the lug 7 in direction 2B, thereby causing an active clearance s to be adjusted between brake disc 2 and brake pad 5. The adjoining gap 61 is sealed against the ingress of dirt by a depression 62 which has a labyrinth effect. Also, a rubber protective cap can be employed.

Figure 6:
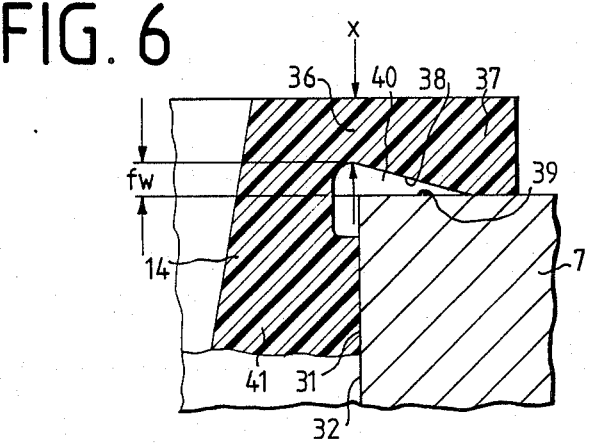
FIG. 6 is a partial transverse cross sectional view of an alternative bolt bolt providing an active clearance.

FIG. 6 shows another arrangement for adjusting an active clearance s. A shoulder 37 on the plastic part 14 adjacent the lug 7 between abutment faces 38 and 39 forms a wedge-shaped groove 40. When applying the brake, owing to a deformation in the area of the constriction 36, spring energy is stored in the plastic part 14. During release of the brake, the faces 38 and 39 are moved apart by spring force, hence, adjusting the active clearance s between brake disc 2 and brake pad 5. The most constricted point 36 between the shoulder 37 of the plastic part 14 and the main part 41 of the plastic part 14 is so dimensioned that the frictional force between the two faces 31 and 32 can be overcome. The elastomeric part 15 is of a rubber-type consistency and is deformable at points A and D, see FIG. 2, such that the spring action in the plastic part 14 is greater than that of the elastomeric part 15.

Figure 7:
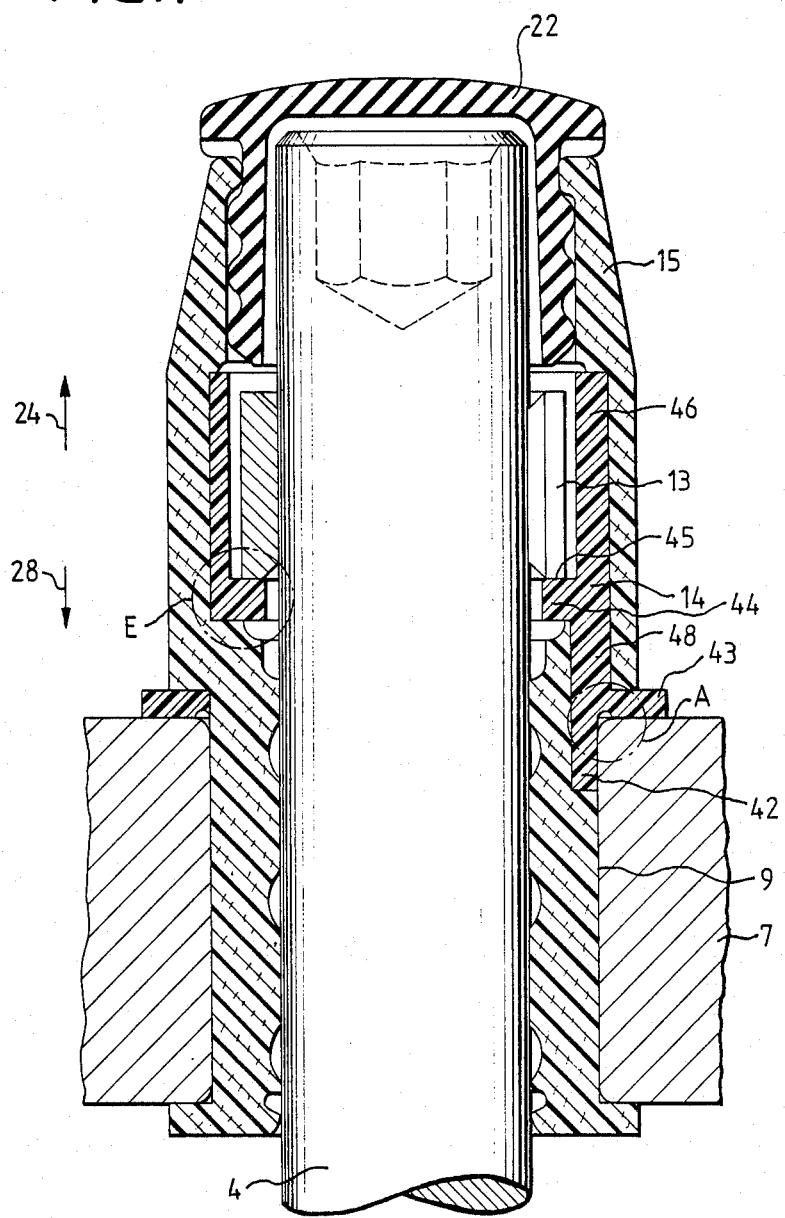
FIG. 7 is an enlarged longitudinal cross section through an alternative bolt guide showing detalis of construction.

FIG. 7 shows another embodiment of a bolt guide arrangement in longitudinal cross-section. The cooperation between the friction ring 13 and the plastic part 14 has been shifted to outside of the bore 9. The area 46 receiving the friction ring, hereinafter referred to as the sleeve end of the holding member 14, is located completely outside of the bore 9. The bore 9 can, therefore, be smaller in size and/or the plastic part 14 may be reinforced. Undercutting within the plastic part 14 is eliminated. The plastic part 14 includes axial projections 42 and a radially outwardly extending ring 43 supported on the lug 7. The plastic part 14 comprises longitudinal grooves in the area of the projections 42 and a central part 48 guided by the elastomeric part 15. The friction ring 13 strikes the stop face 45 of the radially inwardly projecting lug 44 on the plastic part 14. Section 44, 48 forms a stop face 45 which is located completely outside of the bore 9.

The sleeve end 46 of the plastic part 14, toward cap 22, is of an open configuration. The friction ring 13 is located so as to be carried along by the plastic part 14 in the axial direction 24, and in the opposite axial direction 28, is uninfluenced by movement of the plastic part 14. When removing the guide bolt 4 from the brake carrier 3, guide bolt 4, friction ring 13, plastic part 14 and elastomeric part 15 can thus be easily disassembled. The plastic part 14, on the sleeve end 46 for the friction ring 13, is provided with a recess open toward one side to thereby enable the friction ring 13 to be freely inserted in the axial direction 28. During assembly, the friction ring 13 is pushed onto the guide bolt such that the friction ring 13 will strike the face 45 when the guide bolt 4 is fully inserted. The friction ring 13 is frictionally disposed on the guide bolt 4 and during disassembly is withdrawn along with the guide bolt 4 in the direction 24. Detail E in FIG. 7 shows an active clearance on the friction ring.

An important advantage of the present invention is that, during deceleration at a high hydraulic pressure, large travel distances occur at the friction ring 13 through pad compressibility and caliper stretch. If the ring 13 is continued to be guided within a groove in the bushing eye, the available restoring paths might be unable to completely clear the caliper 1 causing residual moments to occur.

Figure 8:
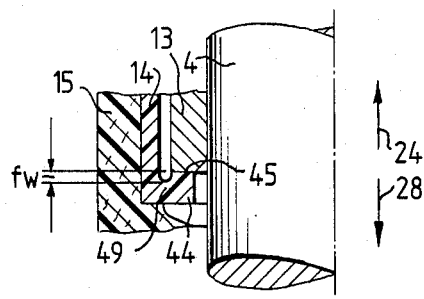
FIG. 8 is a partial cross section showing an active clearance on a friction ring for a bolt guide.

FIG. 8 shows another arrangement for providing an active clearance for a bolt guide on the friction ring 13. During deceleration, the lug 7 and, through lug 7, the elastomeric part 15 and the plastic part 14, are moved in the direction 24, with the surface 45 of the disc-shaped lug 44 of the plastic part 14 striking the friction ring 13. The frictional adhesion between the guide bolt 4 and the friction ring 13 is so dimensioned that the constriction 49 between the lug 44 and the sleeve end 46 of the plastics part 14 is deformed and the lug 44 is forced in the direction 28. The constriction 49 leading to the cup-shaped lug 44 of the plastic part 14 acts as a spring and stores spring energy. Only after storage of the spring energy and overcoming of the active clearance S, is the friction ring 13 displaced in the direction 24. The spring deflections fw between the friction ring 13 and the plastic part 14 and between the lug 7 and the elastomeric part 15 are related to one another. Advantageously, the two spring deflections fw cooperate at any desired ratio, such as fw/2.

Figure 9:
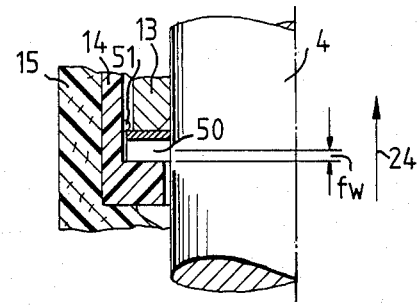
FIG. 9 is a partial cross section showing another active clearance on a friction ring for a bolt guide.

FIG. 9 shows another arrangement. During deceleration, the elastomeric part 15 and the plastic part 14, through lug 7, are moved in the direction 24, with spring energy being stored in the slitted wave spring 50. Only after the active clearance S has been overcome, does the friction ring 13 on the guide bolt 4 move in the direction 24. During disassembly of the guide bolt 4 from the brake carrier 3 and of the bolt guide arrangement 10, the spring holding projection 51 of the plastic part 14—hereinafter referred to as nipple—locks the spring 50 in the sleeve end 46, thereby insuring that spring 50 does come out.

Figure 10:
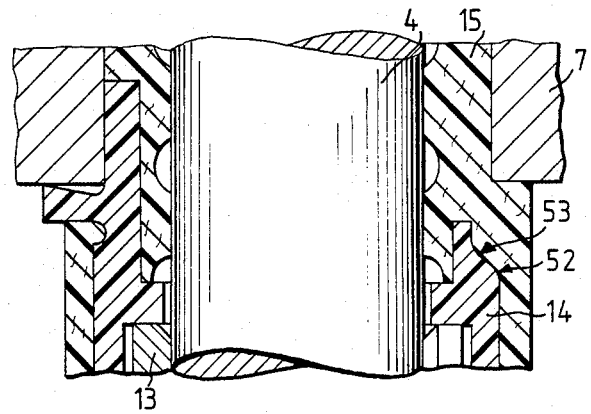
FIG. 10 is a partial cross section showing details of a plastic holding member.

FIG. 10 shows an advantageous embodiment of a plastic part 14. The plastic part 14 comprises curved portions 52 and 53 so that during casting of the plastic part with the elastomeric part 15, the elastomeric part 15, at the curve portions 52 and 53, will better spread.

Figure 11:
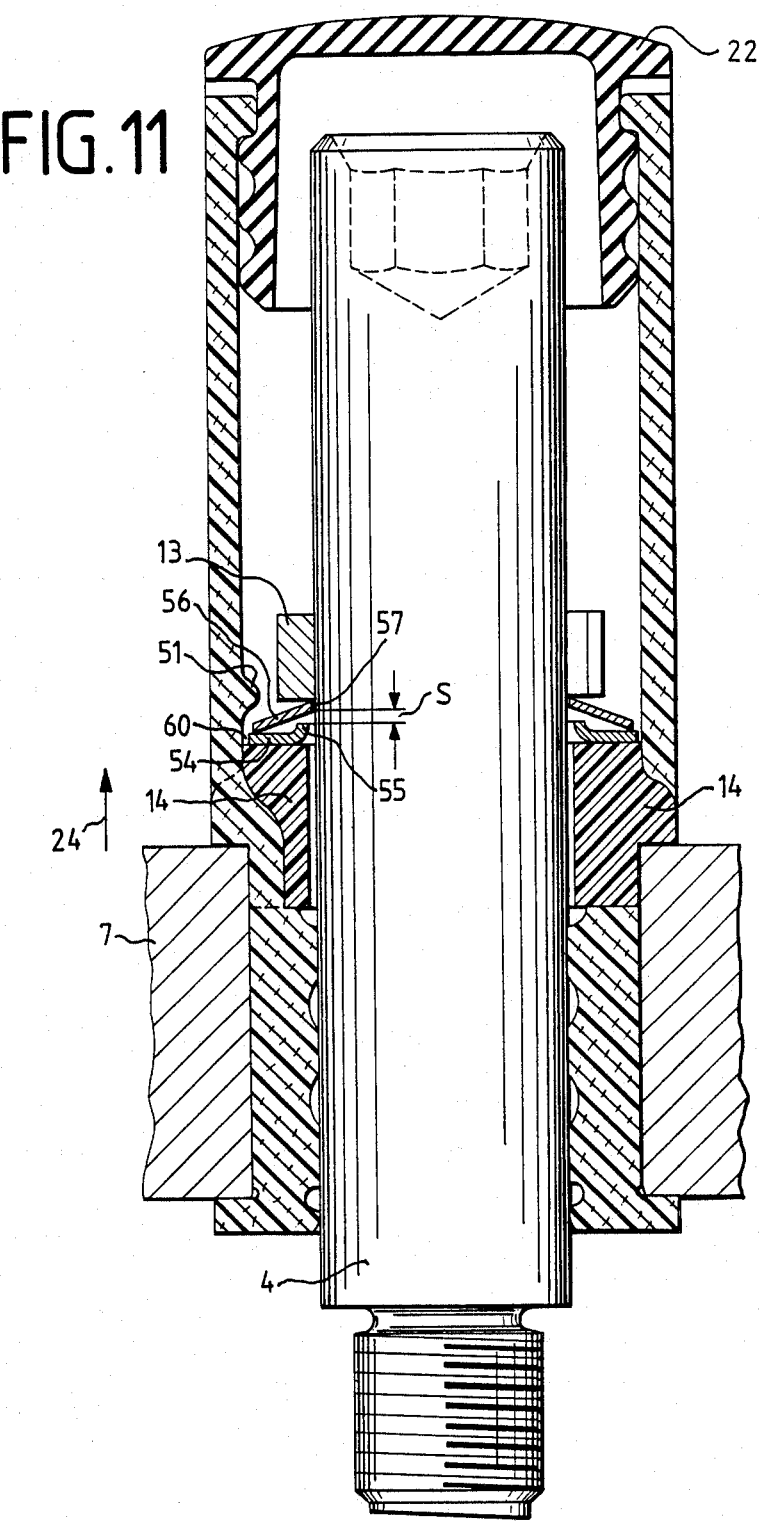
FIG. 11 is an enlarged longitudinal section through a third embodiment of a bolt guide showing details of construction.
Figure 13:
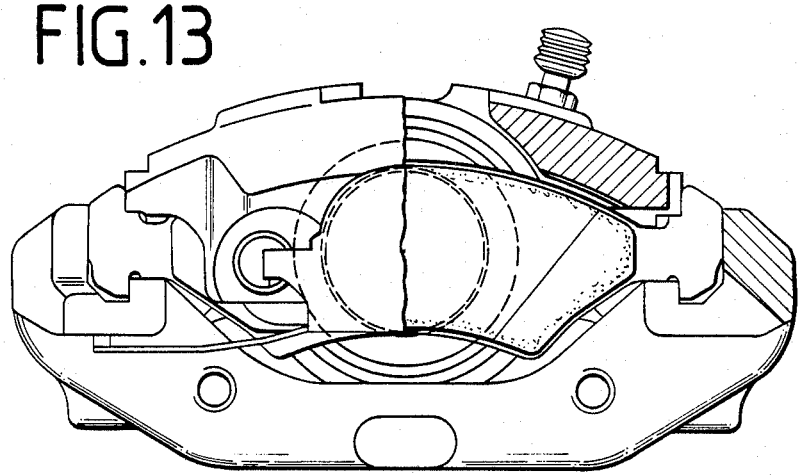
FIG. 13 is a side view of a fist caliper spot-type disc brake to which the invention is applicable; and, FIG. 14 is a plan view of the fist caliper spot-type disc brake of FIG. 13 with a portion at the bolt guide cutaway.

FIG. 11 shows a cup spring 56 and a ring 54 with a stop 55 arranged between the friction ring 13 and the plastic part 14 having an end face 60 facing the friction ring 13. During deceleration, the lug 7 is moved in the direction 24. The lug 7 forces itself against the plastic part 14, and the plastic part 14, through ring 54 and the cup spring 56, forces itself against the friction ring 13. After the active clearance S has been overcome, the inner part 57 of the cup spring 56 forces itself against the lug 55 of the disc 54. The arrangement of the disc 54 with the lug 55 and the cup spring 56 also can be effected between the plastic part 14 and the lug 7. The nipple 51 is located on the elastomeric part 15.

Figure 12:
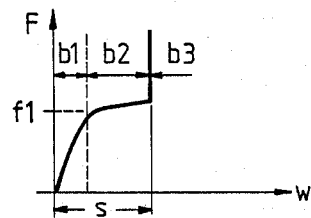
FIG. 12 is a force-displacement diagram for a spring used in the bolt guide arrangement according to the invention.

FIG. 12 shows a preferred spring load rate. After the active clearance s has been overcome and after the cup spring 56 has struck the lug 55, the spring load rate F will infinitely rise. The spring load rate F, through a path w, comprises three areas b1, b2 and b3. In area b1, the spring is loaded; in area b2, the spring has a constant load rate f1; and in area b3, the spring load rate rises infinitely.

Figure 14:
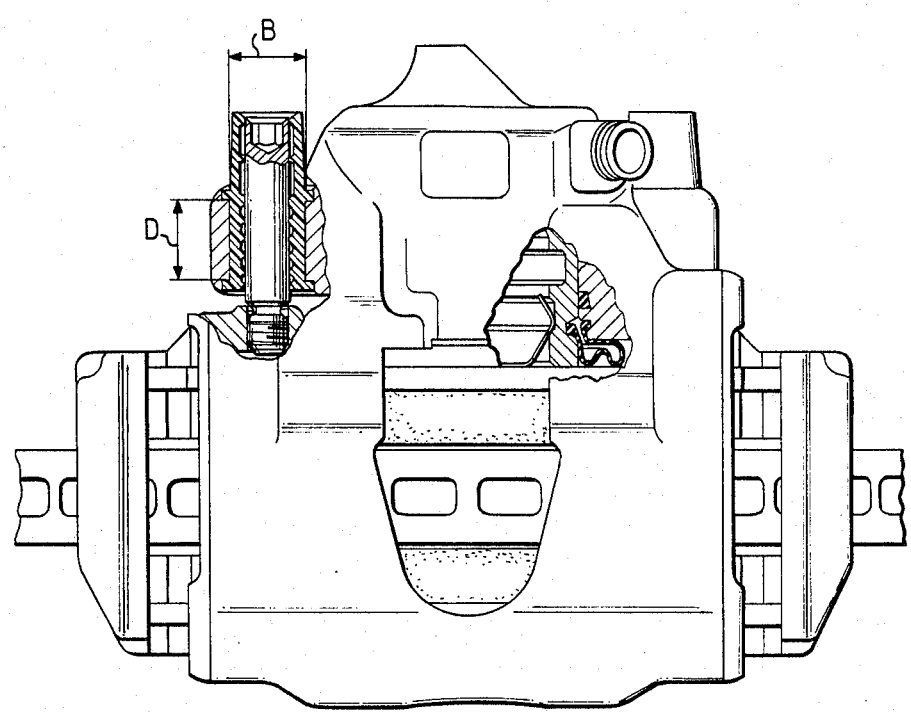

FIG. 14 is a plan view of a fist caliper spot-type disc brake of the FN-type employing the guide bolt arrangement. Advantageously, the bushing of the fist caliper spot-type disc brake can be buttoned into the bore 9 in the form of a bushing, with the bore diameter B and the length D of the bushing being standardized so as to permit easy and quick replacement of the bushing.

What is claimed is:

1. A floating caliper spot-type disc brake, comprising a brake carrier, at least one guide bolt arrangement, a brake housing displaceably disposed on the brake carrier by said guide bolt arrangement, said guide bolt arrangement including a guide bolt attached to the carrier extending into a bore in said brake housing, an elastomeric part in said bore surrounding the bolt, a holding member in said elastomeric member, a friction ring in said holding member, said friction ring mounted to said bolt in a manner to be carried along by the holding member in an axial direction, said holding member, in the area of the bore, is smaller in diameter than the bore diameter.

2. The disc brake according to claim 1 wherein the holding member includes a cone-shaped face expanding radially outwardly and being provided at an end at which said friction ring is receivable.

3. The disc brake according to claim 1 wherein the holding member includes a stop face, said stop face faces the guide bolt.

4. A floating caliper spot-type disc brake, comprising a brake carrier, at least one guide bolt arrangement, a brake housing displaceably disposed on the brake carrier by said guide bolt arrangement, said guide bolt arrangement including, a guide bolt attached to the carrier extending into a bore in said brake housing, an elastomeric part in said bore surrounding the bolt, a holding member in said elastomeric member, a friction ring in said holding member, said friction ring mounted in a manner to be carried along, in an axial direction, by the holding member, wherein an area of the holding member in which the friction ring is received is located completely externally of the bore.

5. The disc brake according to claim 4 wherein the holding member includes a stop face located completely externally of the bore.

6. The disc brake according to claim 4 wherein the holding member includes a recess for receiving the friction ring said recess being open toward one end of the holding member such that the friction ring is freely insertable into the recess in an axial direction.

7. A floating caliper spot-type disc brake, comprising a brake carrier, at least one guide bolt extending from the carrier, a brake housing which, in an axial direction of the guide bolt, is displaceably disposed on the brake carrier, a bolt guide arrangement comprising a bore in the carrier, an elastomeric part in the bore surrounding the bolt, a holding member in the elastomeric part, a friction ring in said elastomeric part mounted to be carried along, in an axial direction, by the holding member, said holding member having an end face facing the friction ring, and a cup spring located between the friction ring and the end face.

8. The disc brake according to claim 7 wherein a stop member is located between the cup spring and the end face.

9. The disc brake according to claim 7 wherein a spring retaining projection is provided on the holding member.

10. The disc brake according to claim 7 wherein a spring retaining projection is provided on the elastomeric part.

11. The disc brake according to claim 7 wherein spring energy is storeable in the holding member.

* * * * *